N. E. GUERIN.
Egg Hatching Apparatus.
No. 3,019.
4 Sheets—Sheet 1.
Patented March 30, 1843.
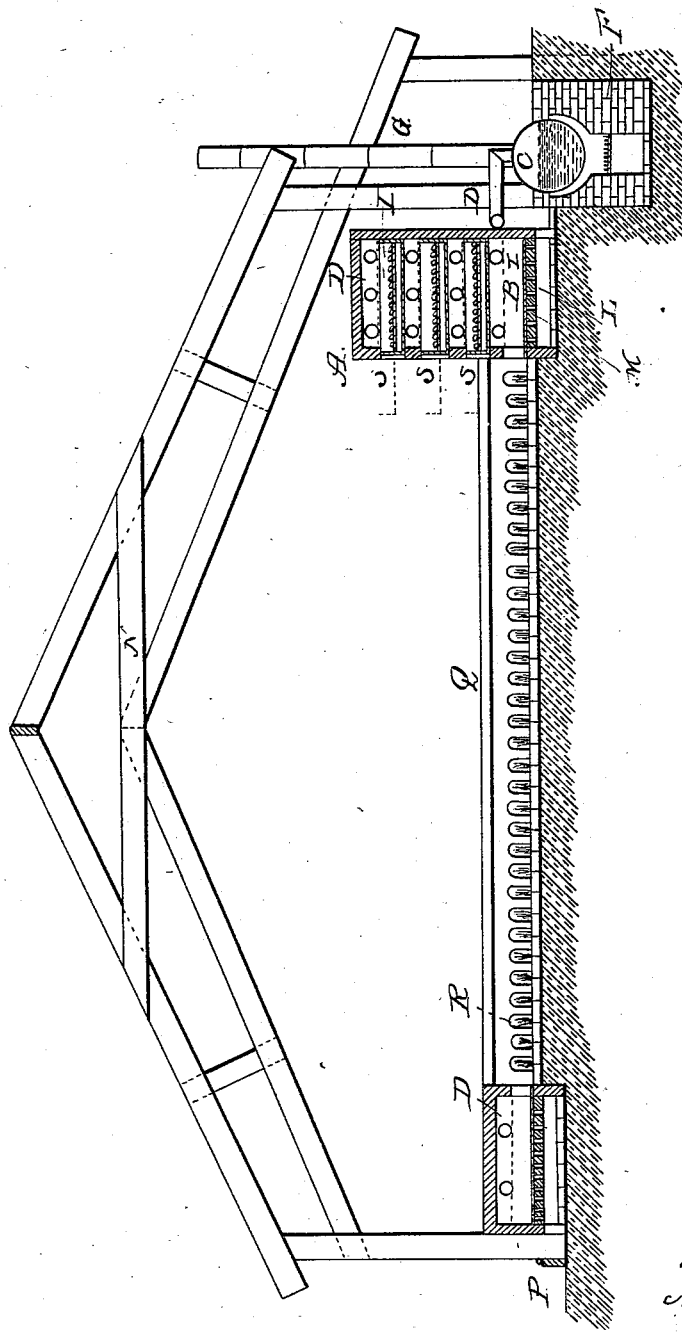
INVENTOR N. E. GUERIN.
Egg Hatching Apparatus.
No. 3,019. Patented March 30. 1843.
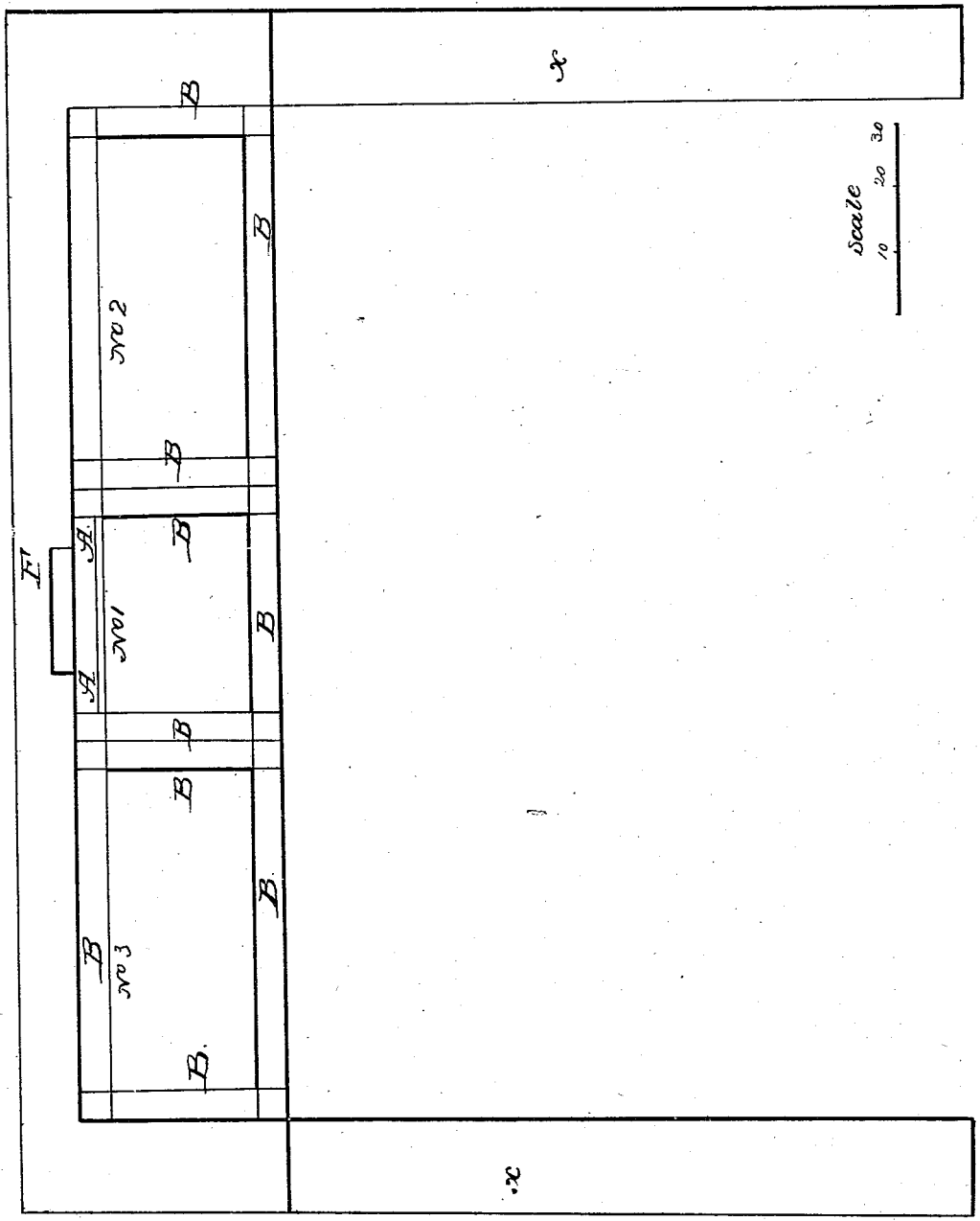
INVENTOR N. E. GUERIN.
Egg Hatching Apparatus.
No. 3,019.
4 Sheets—Sheet 3.
Patented March 30, 1843.
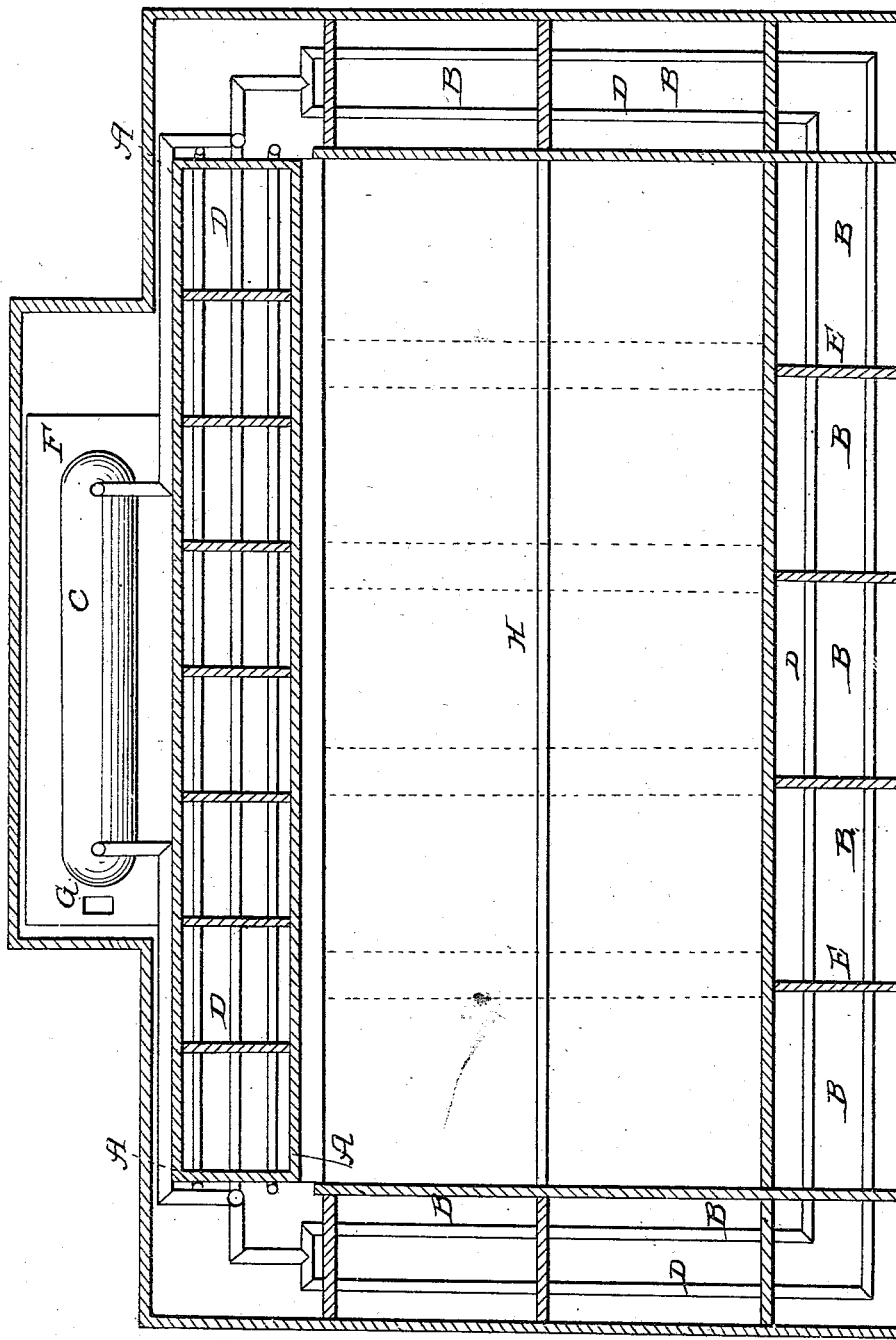
INVENTOR
N. E. Guerin N. E. GUERIN.
Egg Hatching Apparatus.
No. 3,019.
4 Sheets—Sheet 4.
Patented March 30, 1843.
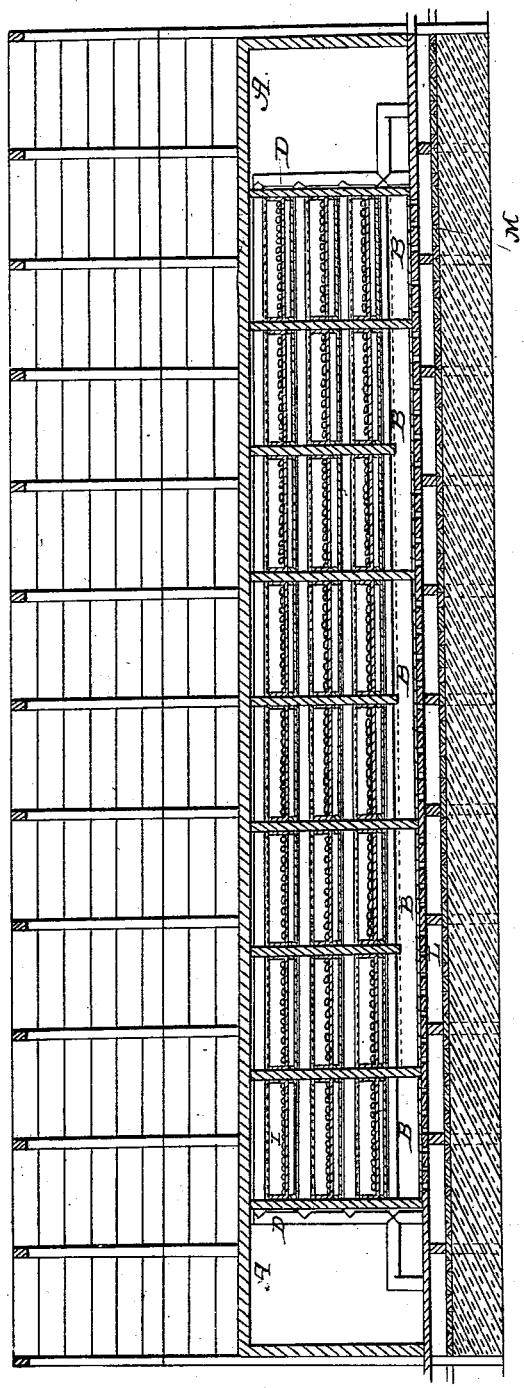

UNITED STATES PATENT OFFICE.

NAPOLEON E. GUERIN, OF NEW YORK, N. Y.

HATCHING CHICKENS.

Specification of Letters Patent No. 3,019, dated March 30, 1843.

*To all whom it may concern:*

Be it known that I, NAPOLEON E. GUERIN, of the city of New York, county and State of New York, have invented an Artificial Method of Rearing Chickens; and I do hereby declare that the following is a full and exact description.

The nature of my invention consists in a method of rearing the chickens, after the hatching of the eggs, in an oven as herein described.

Several attempts have been made to hatch eggs by artificial means, and to rear the chickens thus produced. The first of these operations has been successful, but all efforts to rear the chickens have been hitherto fruitless; from the circumstances that those who made the experiments considered the chicken as an animal which was endowed with the faculties of locomotion and of sight, and was also enabled to partake of food from the moment of its birth, and under this impression all that was necessary, or deemed so, was to protect the young birds from the inclemency of the weather, and they were accordingly kept in heated apartments without air. Although the chicken is a bird which is easily reared, since it is able to eat, as it were, at the moment it breaks its shell, still it must be admitted that there are also certain requisites which are indispensable to its existence, namely, air and heat judiciously combined. If the attempts above alluded to had been effected by men of observation, residing in the country, they would have doubtless been more successful in their undertakings, as it is extremely probable that they would have observed the method adhered to by the farmer's wife, when by some mishap a newly hatched brood of chickens are deprived of the mother who would so faithfully have watched over them; a method it may be remarked which almost invariably succeeds, they are taken by the farmer's wife and placed in a loosely woven basket, in the bottom of which some fresh straw has previously been deposited, the whole being covered with cotton or wool, after which the basket is brought near the fire, where it is left for a fortnight and there receive the heat from it. If you ask these women the motive of this mode of treating the young chicken, they will merely answer that they do not know why this system is pursued in preference to any other, but that they have seen their mothers follow the same method and meet with similar success. A careful observer will at once perceive in this the way in which the hen's place may be adequately supplied; we always see the feet of the chickens on the ground which keeps them in a cool state, even when guarded by its parent, while the head and upper part of the body are warmed by the heat derived from the hen's body. Whether we ascribe the means employed by the farmer's wife, to chance as to a series of observations, it would be impossible to imitate nature more effectually, since the chicken obtains thus air from below and warmth from above.

*Drawing No. I. Ground plan of a building for the artificial hatching of seven thousand five hundred eggs (7,500) and rearing the chicken during the first month of its existence.*—A A A A, hatching oven with eight divisions, for the reception of twenty four drawers, three in each division and placed one above the other, each drawer to contain from three hundred and thirteen to three hundred and fourteen eggs (313 to 314). B B B B, nests for the chickens to sleep in; these are arranged along the whole apartment, the hatching oven being placed on the top of the nests on one side of the apartment. C the steam boiler. D D D D steam pipes for heating the oven and the upper part of the nests. E E E cross pieces to support the steam pipes. F mason work of the boiler. G, flue of the boiler. H stream of water which traverses the length of the building; this is to water the chickens and is kept very clean; it must be constantly renewed. The space between the four ranges of nests is paved with brick, and is used as a yard for the chickens.

*Drawing No. II. Describes the length and height of the oven for hatching.*— A sectional plan, or view of the oven according to the line O O of the ground plan, so as to admit of being seen in all its parts. B the nests under the oven. D steam pipes. There are nine of these in the oven, and they are placed by threes over each drawer; the heat does not bear directly upon the eggs; a piece of stout cotton duck is placed where there is a red painted line in the plan, which absorbs the heat at first and then gives it out equally upon each drawer. I drawer to contain the eggs; this is divided in two parts by a mat supported by a netting whereby a vacant space is left between the eggs and the bottom of the drawer. Drawing No. III gives an explanation of this. J mat placed upon the bottom of the nests. K bottom of the nests; a number of irregular holes are bored in it, to admit fresh air to the mat where the chickens are. L conduit through which air enters from the exterior. M brick pavement of the conduit above mentioned. N woodwork of the building.

*Drawing No. III.* The oven for hatching viewed across, and the apartment where the chicken is kept during the first month.—The same letters refer to the same parts as those indicated in the preceding drawings. P valve to admit external air into the conduit already mentioned, and which conveys it under all the nests. It will be noticed that the holes bored in the bottom of the nests are of irregular dimensions; the smaller ones are nearer to the valve and the larger are the most distant from it; the object is to distribute the air equally under the mat. Q front view of one of the sides of the nests. R openings or doors for the ingress and egress of the chicken; these doors are concealed by split pieces of colored cotton or worsted stuffs. This arrangement allows the chicken to pass to and fro freely as it would have done under the care of the hen, by moving her feathers to one side or the other. S front view of the drawers for hatching with openings concealed as the preceding, by slit pieces of colored stuffs on a level corresponding with that of the mat. The dotted line shows the elongation added to each drawer the first day that the chickens are hatched. The black line or mark, on a level with the vacant space left between the mat and the bottom of the drawer, shows the holes which are unstopped on the same day to admit the air. The following explains this: The chicken must not be touched the first day nor even during half the second day that it is hatched. They are to remain in their respective drawers, the elongation or lengthening of the drawers forms a gallery where the young bird may take exercise, passing between the slit colored stuffs already mentioned the air which passes through the mat affords the means of respiration to those chickens who are not disposed to take exercise. The chickens become accustomed to the particular color of the stuff; they recognize it as the color of their parent. When the period has arrived for their removal from the drawers to the apartment where the nests are, they are not at a loss which nest to select, but proceed at once to that with which they have become familiarized. This shows that the color of each side of the nests must correspond to that of the drawers where the chickens were hatched.

*Drawing No. IV.* General plan of the buildings.—No. 1, room where the chickens are hatched and where they remain during the first month. The letters correspond to the preceding plan and point out the oven, the nests and the spot where the boiler is placed. No. 2, apartment where the chickens are kept during the second and third month; the nests are arranged around the whole room; they are no longer heated by the steam of the boiler but derive the necessary warmth from small furnaces placed at the four angles of the room, by means of which the water is heated for the steam to be conveyed by the conduits. This apartment is larger by half than room No. I and is situated to the right of room No. 1. No. 3, a similar apartment situated to the left of No. 1.

The hatching must be conducted so as to obtain a fresh brood as soon as the chickens are a month old. When they have obtained that age they are removed to the next room, in order that the newly hatched ones may occupy their place; for this purpose, sliding doors are placed Z Z and thus divide room No. 1 from Nos. 2 and 3. As soon as they are removed by this simple contrivance, the sliding door is replaced as before and the rooms are again separated. As soon as the chickens of the second hatching have remained one month in room No. 1, the sliding door is again withdrawn, but to pass them in room No. 3. The heat in the nests of No. 2 begins now to be progressively diminished and small perches are placed in the room, for many chickens at that age, prefer to roost rather than to sleep in the nests. The third set of eggs having been hatched, the chickens of No. 2 are by this time three months old, and are therefore of a proper age to be transferred to the yard with roosting places; the small perches are then removed to room No. 3, where the chickens are now two months old. The chickens of the third set of eggs are now removed to No. 2, those of the fourth set to No. 3, and so on during the year. Thus it will be seen that the chickens are not removed to the yard before they are three months old; the heat during the third month which has been gradually diminishing and the perches to which they have become accustomed enables them to bear the change or removal to the yards where they are to remain until they are sold.

X X large roosting places, built at the two ends of the building; they are divided lengthwise in two parts and the yard is similarly partitioned off so as to contain chickens of the same age, in order that when the time of selling them arrives, it may be easy to select from any brood. Without this precaution it would be impossible to make a proper selection.

What I claim as my invention, and desire to secure by Letters Patent, is:

1. The mode of giving and distributing the heat derived from the steam pipes, as well upon the eggs in the hatching oven, as upon the chickens in the nests.

2. The plan of making the colors of the slit pieces of cotton or worsted stuff of the hatching drawers correspond with the sides of the nests in the apartments where similar slit pieces are used.

3. The elongation or lengthening of the drawers, and admitting of air at the moment the birds break their shells.

4. The mode of purifying the air under the nests by the admitting of vital air during the three first months of the chicken's existence and before it can live in open yards without danger.

5. The method of keeping the chickens in two apartments, one on the right and the other on the left side, of the apartment where the hatching takes place and where it may thus be continued without any interruption.

6. Finally, the drawings, the specifications and the model explain and show these new arrangements or dispositions, which have not, to my knowledge, been used or adopted in any of the countries where the artificial hatching and rearing of chickens has been attempted.

N. E. GUERIN.

In witness of—
EDW. BAYER,
LAURENCE KENNEDY.